United States Patent

[11] 3,534,834

[72] Inventor: Robert E. Sankey
New Castle, Pennsylvania
[21] Appl. No. 720,225
[22] Filed April 10, 1968
[45] Patented Oct. 20, 1970
[73] Assignee The Goodyear Tire & Rubber Company
Akron, Ohio
a corporation of Ohio

[54] AUTOMATIC BRAKE ADJUSTER
4 Claims, 1 Drawing Fig.
[52] U.S. Cl. .................................... 188/196, 188/72
[51] Int. Cl. .................................... F16d 65/52, F16d 55/15
[50] Field of Search .................................... 188/72–73(C), 196

[56] References Cited
UNITED STATES PATENTS
2,743,790 5/1956 Bricker .................................... 188/196X
2,886,140 5/1959 Trevaskis .................................... 188/196X
2,973,837 3/1961 Wilson .................................... 188/196X
3,376,959 4/1968 Holcomb et al. .................................... 188/196

Primary Examiner—Duane A. Reger
Attorneys—Oldham and Oldham; F. W. Brunner and P. E. Milliken ABSTRACT: This invention proposes the use of an adjuster pin which is attached at one end to the pressure plate and at the other end to the brake housing which pin is made of a ductile material and designed to yield at some predetermined value. For each increment of brake lining wear, there is a corresponding increment of adjuster pin permanent stretch or elongation. With this invention, running clearance between a pressure plate and disc stack is kept constant by restricting the pressure plate return distance automatically by the amount of permanent elongation in the pin caused by its ductile characteristics when a pressure load is applied to the pressure plate. The elongation is exactly equal to the amount of friction material wear experienced by the disc stack during the energy absorption period.

Patented Oct. 20, 1970
3,534,834
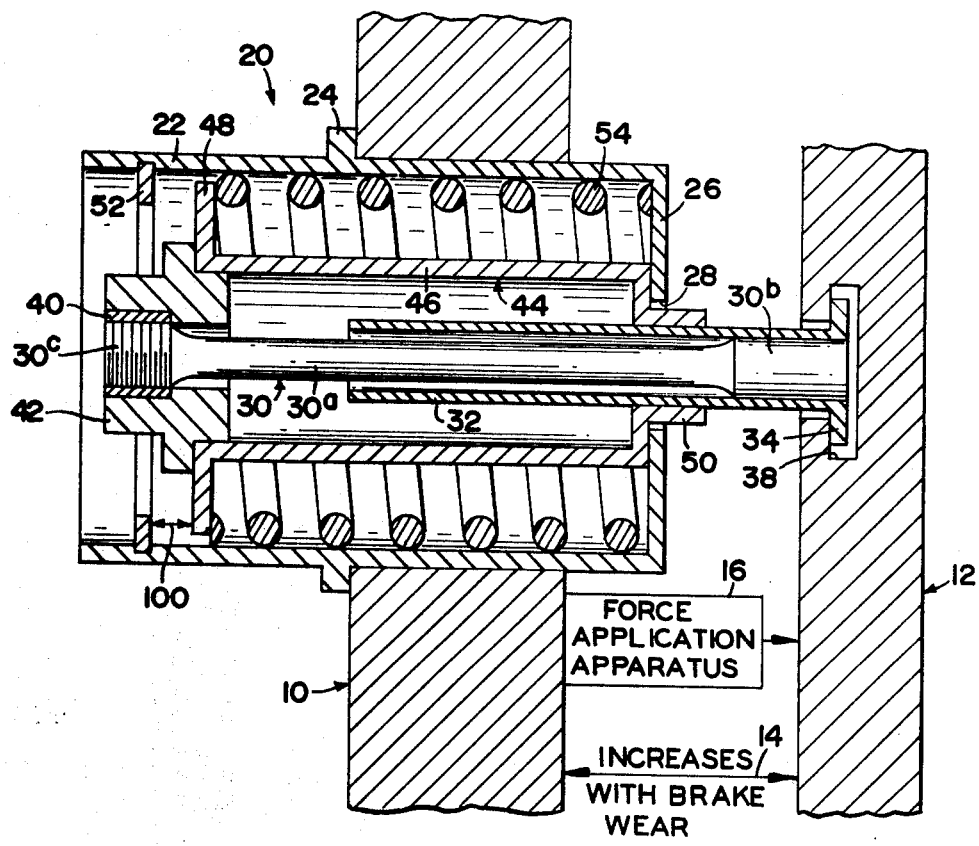
INVENTOR.
ROBERT E. SANKEY
BY
Oldham & Oldham
ATTORNEYS

AUTOMATIC BRAKE ADJUSTER

The general purpose of this invention is to provide a new concept in the field of automatic brake adjustment with an increased reliability to the overall braking system. Heretofore, automatic brake adjusters have relied upon friction devices which tend to produce unpredictable loads, and under vibrating conditions tend to slip and cause a loss of running clearance.

The instant invention is achieved by utilizing the principle of permanent elongation to an adjuster pin made from a ductile material which precisely, reliably, and very inexpensively provides a controlled spaced relationship between a brake housing and pressure plate to compensate for brake lining wear as it becomes necessary to restrict pressure plate return distance in order to obtain a constant running clearance between the pressure plate and disc stack.

The aforesaid objects of the invention and other objects which will become apparent are achieved by providing a device to compensate for a gradually increasing spaced relation between a brake housing and a pressure plate caused by lining wear which includes means to provide a force to move the plate away from the housing and is characterized by an adjuster pin having one end connected to the housing and the other end connected to the plate which pin is ductile under the force pushing the plate away from the housing and is permanently set to substantially maintain the proper spaced relation of the housing and the plate when the force is removed.

The clearance, or distance the pressure piston is returned, is a constant and is equal to the allowable travel of the spring holder within the housing. Therefore, the piston travel required to apply the brake is constant regardless of the extent of lining wear, thereby limiting the displacement of hydraulic fluid required to bring the friction members to contact.

For a better understanding of the invention, reference should be had to the accompanying drawing which illustrates by a cross-sectional, plan view, a preferred embodiment of the adjuster assembly of the invention.

With specific reference to the form of the invention illustrated in the drawing, the numeral 10 indicates generally a brake housing, and the numeral 12 indicates generally a pressure plate which is adapted to force friction elements (not shown) against some type of moving element (also not shown) to effect a braking action. Naturally, as lining wear occurs, the spaced relationship, indicated by arrow 14, between the brake housing 10 and pressure plate 12 increases. It is this increasing distance which makes it necessary to restrict the pressure plate return distance so that in effect brakes can be applied with uniform force in a controlled response period at the touch of the foot pedal or applying means. In the usual manner, any suitable force application apparatus 16, such as a hydraulic piston or the like, may be provided to uniformly force the pressure plate 12 away from the brake housing 10 when brake application is desired.

The essence of the invention is provided by a brake adjusting apparatus indicated generally by the numeral 20 which comprises an adjuster housing 22 mounted in fixed relationship to the brake housing 10 through an appropriate aperture therein and brazed or otherwise suitably retained in position with an annular collar 24 abutting against the outside end and defines a cylindrical shape on its interior with a closed bottom end 26 having a smaller aperture 28 through the bottom end 26.

The actual connection between the adjusting apparatus 20 and the pressure plate 12 is provided by an adjuster pin indicated generally by the numeral 30. One end of the pin 30 is mounted inside a hardened steel sleeve 32 having a flared shoulder 34 which cooperates with a recessed undercut 38 in the pressure plate 12. The pin 30 is appropriately brazed, welded, locked, or otherwise secured to the sleeve 32. The pin 30 is mounted on its other end to a ring 40 which is received in recessed relationship by a supporting ring 42. The supporting ring 42 is removably seated into a spring holder assembly indicated generally by the numeral 44. The spring holder assembly 44 has a hollow elongated cylindrical central portion 46 with a radially outwardly directed flange 48 on one end and a reduced diameter concentrically aligned neck 50 which slidably is received through the aperture 28 in the base of the housing 22 so as to align the spring holder assembly 44 within the housing 22. The sleeve 32 is slidably received through the reduced diameter neck portion 50 of the assembly 44. An annular snap-type locking ring 52 snaps into a recessed groove inside the housing 22 and limits the longitudinal travel of the assembly 44 in one direction while the flange leading to the neck 50 abutting against the bottom inside of the base 26 limits the movement of the assembly 44 in the opposite direction. Again, a suitable connection of the rod 30 to the ring 40 could be utilized, for example, a threadable connection, a brazed connection, or some type of pin arrangement would be suitable. A coiled helical spring 54 surrounds the outside of the assembly 44, and rides against the bottom 26 of the housing 22 and against the flange 48 of the assembly 44. The spring is a compression-type spring and tends to bias the assembly 44 towards the left as viewed in the drawing, or in other words, tending to move the plate 12 towards the brake housing 10 until the flange 48 contacts the ring 52.

Thus, it should be understood that in actual operation of the brake, the force application apparatus 16 is forcing plate 12 to the right or away from the brake housing 10, as seen in the drawing, which causes movement of the assembly 44 within the housing 22 from its normally bottom retained position with the flange 48 against the locking ring 52. The drawing, however, indicates the apparatus in an actuated condition where the plate 12 has moved far enough to the right to cause the assembly 44 to bottom against the plate 26 which means that all further force applied by the apparatus 16 is taken directly and completely on the shank or central portion of the pin 30. It is at this point that the feature of the invention comes into play. Specifically, the pin 30 is made from a ductile material and critically designed to yield at some predetermined force value. This yielding is in the form of permanent elongation allowing the plate 12 to move farther in spaced relationship from the housing 10 without actual structural damage, breakage, or other strains over desired limits, other than the elongation of the pin 30. When the brake application has been completed, and the force from the apparatus 16 is released, the spring 54 forces the assembly 44 back to its seated position against the retaining ring 52 allowing the rotating member or other movable member to operate within controlled dimensional limits (constant running clearance) which is directly equal to the distance 100 without friction drag with respect to the linings actuated by the plate 12. This clearance or reset by the spring 54 is only to prevent brake drag.

The particular quality and design of the pin 30 is critical to the proper performance of this invention, and some of these features should be stressed herein. The cross-sectional area and length must be such as to allow sufficient elongation of the pin without failure to compensate for maximum wear of the friction material, but at this point of elongation, the pin must still have sufficient strength to give a safety factor to avoid rupture or breakage. Another problem is how to hold or anchor the ends of the ductile pin 30 so that elongation will only occur in the central portion, or will occur without failure to the anchored portions. The length and cross-sectional diameter of the pin 30, together with the selected material are critical factors in the proper design thereof. Naturally, any suitable technique or structure to achieve an anchored relationship of the pin 30 to the plate 12 and with respect to the brake housing 10 is a secondary object of the invention. However, the structure found most suitable for this purpose is achieved by calculating the predetermined force at which permanent yielding is desired in the central portion of the critical length of the pin 30 and then adding a certain safety factor which in turn determines cross-sectional area of the pin attachment. Physically this is accomplished by beefing up or enlarging the ends of the central core portion so that they have sufficient cross-sectional area that they will not yield or elongate before yielding takes place in the smaller cross-sectional area along the central portion of the pin. Hence, it should be seen that the pin 30 actually comprises a reduced uniform cross-sectional central area 30a tapering into enlarged uniform cross-sectional ends 30b and 30c. It is the ends 30b and 30c which are joined to the sleeve 32 and ring 40, respectively. In the preferred embodiment of the invention as now practiced, the pin 30 is made from metal, and hence a brazed joint between the metallic surfaces has proved sufficient to meet the objects of the invention. However, it is conceivable and should be understood to form a part of this invention that other suitable materials might be utilized for the pin 30. For example, some synthetic plastics, nylons, or the like, with appropriate yield characteristics (i.e., having a flat E-S curve) might be quite suitable to make the pin 30. In these instances, of course, other attaching techniques of the enlarged diameter end portions to the respective supports would be necessary. In some instances, it has been found desirable to thread the enlarged end section 30c to ring 40 so as to allow some lateral adjustability upon the initial positioning of the adjuster 20 in a new brake assembly since the same spaced relationships will not always be present between the plate 12 and brake housing 10 because of slightly different variations in the thickness of the friction lining associated with the brake. As another desirable feature of the invention, the sleeve 32 should extend a considerable distance down over the reduced diameter central portion 30a so as to prevent this section 30a from being exposed to possible damage from rocks, or other external elements as it elongates into the space between the brake housing 10 and plate 12 as lining wear occurs. If there is any damage to this cross-sectional configuration, it naturally would result in premature failure of the pin in its designed yielding characteristic.

It has been found that suitable metals to form the pin 30 are Naval Brass, available at any Metal Supply Center, or Hastalloy (B), a high nickel alloy as made by Haynes Alloy. Both of these metals have excellent ductile properties before fracture, and it has been found that in a design configuration similar to that shown in the drawing, that the pin 30 will stretch 60 percent before fracture. Naturally, the design configuration must take into consideration the ductile characteristic of the material and allow a sufficient safety margin so that the pin 30 will stretch safely until all lining wear has occurred and it is necessary to replace the linings associated with the brake, without ultimate fracture or failure of the pin.

While in accordance with the patent statutes only one best known embodiment of the invention has been illustrated and described in detail, it is to be particularly understood that the invention is not limited thereto or thereby, but that the inventive scope is defined in the appended claims.

I claim:

1. An automatically adjusting brake which comprises: a brake housing, a pressure plate, pressure means mounted to the housing operatively associated with said plate to cause movement of said plate upon actuation thereof, and an adjuster housing mounted to the brake housing which is characterized by; an elongated adjuster pin having the shank thereof slidably received through said adjuster housing with one end thereof connected to said pressure plate and the other end thereof connected to said adjuster housing, said pin having a substantially centrally located reduced diameter portion of uniform cross section along its length extending at both ends thereof into tapered relation into a larger diameter portion, where said reduced diameter portion is ductile allowing the pin to stretch and substantially elongate from its original length to extend across the space between the brake housing and pressure plate as this space becomes increasingly greater upon brake lining wear.

2. A brake according to claim 1 where said other end of the pin is threadedly and adjustably received by the adjuster housing to allow adjustment of the spaced relationship between the pressure plate and the adjuster housing, and where the reduce diameter portion of the pin will elongate sufficiently to allow at least a 60 percent increase in the overall length of the pin.

3. A brake according to claim 2 where said one end of the pin is mounted in fixed relationship to the pressure plate, and which includes an elongated sleeve fixed to said one end of the pin and extending along the length thereof to surround and protect substantially the entire reduced diameter proportion thereof.

4. A device to compensate for gradually increasing the spaced relation between a brake housing and a pressure plate caused by lining wear including means to provide a force to move said plate away from said housing which is characterized by an adjuster pin having enlarged end sections with one end section carried in fixed relation with the housing and the other end section in fixed relation with the plate, said pin having a reduced diameter along at least a portion of its length which section is ductile under the force pushing the plate away from the housing and is permanently set substantially the amount of lining wear to substantially maintain the spaced relation of the housing and the said plate to compensate for said lining wear when said force is removed, said portion extending in tapered relation into the enlarged end sections, the reduced diameter portion allowing enough extension of the pin to compensate for all lining wear.